Figure 1:
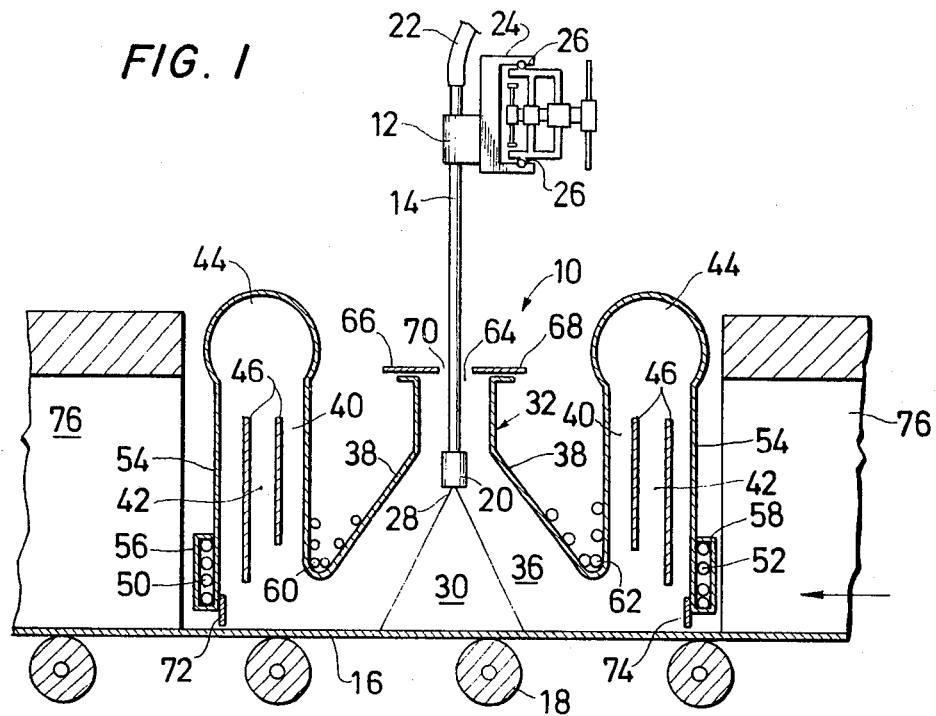

United States Patent [19]

Maeda et al.

[11] 4,042,363
[45] Aug. 16, 1977

[54] METHOD AND APPARATUS FOR COATING GLASS

[75] Inventors: Takeshi Maeda; Seiki Okino, both of Matsusaka, Japan

[73] Assignee: Central Glass Co., Ltd., Ube, Japan

[21] Appl. No.: 679,708

[22] Filed: Apr. 23, 1976

[30] Foreign Application Priority Data

Apr. 25, 1975 Japan ................................. 50-50517

[51] Int. Cl.² ............................................. C03C 17/10
[52] U.S. Cl. .................................... 65/60 R; 65/181; 118/65
[58] Field of Search ................... 65/60 R, 60 A, 60 B, 65/60 C, 60 D, 181; 118/65

[56] References Cited

U.S. PATENT DOCUMENTS

| | | | |
|---|---|---|---|
| 2,675,646 | 4/1954 | Kramer et al. | 65/60 R X |
| 3,067,056 | 12/1962 | Remer | 118/65 X |
| 3,224,860 | 12/1965 | Stinnes | 65/355 |
| 3,565,039 | 2/1971 | Remer | 118/65 X |
| 3,689,304 | 9/1972 | Bamford | 65/60 B |

Primary Examiner—Arthur D. Kellogg
Attorney, Agent, or Firm—Fleit & Jacobson

[57] ABSTRACT

A method and apparatus for controlling the temperatures of inner wall surfaces of a hood and of the atmosphere in the vicinity of the inner wall surfaces in the process of fabricating heat-reflecting glass sheets by means of a traversing spraying means which is located over a transfer line of a hot glass sheet. The hood is provided with means to maintain the temperature of the inner wall surfaces which surround a spraying zone and onto which solution particles from the spraying means are caught or deposited and the temperature of the atmosphere adjoining the inner surface walls at such a suitable level that the metal compound in the solution particles which has been caught on the inner wall surfaces of the hood is vaporized in an undecomposed state and removed together with the gaseous solvent and decomposition gas.

8 Claims, 2 Drawing Figures

METHOD AND APPARATUS FOR COATING GLASS

This invention relates to a method and apparatus for fabricating heat-reflecting glass, and more particularly to improvements providing means for adjusting the temperature of inner wall surfaces of a hood which is provided to surround a spray-coating zone and of an atmosphere in the vicinity of the inner wall surfaces.

In the production of heat-reflecting glass, it is known to use an apparatus which comprises a spraying means for spraying on one surface of a moving hot glass sheet a solution of a metal compound capable of being converted to a corresponding metal oxide(s) by thermal decomposition, and a hood surrounding a spraying zone and provided withh an exhaust means for forcibly exhausting a decomposition gas derived from the metal compound solution through exhaust ducts which communicate with the spraying zone.

In the process for forming a metal oxide film on the glass surface by the use of an apparatus of the type mentioned above, part of the sprayed solution invariably deposits in the lower portion on the inner surfaces of the hood, precipitating fine powder in situ under the influence of the hot ambient temperature. The fine powder deposits will give a detrimental influence on the quality of the final heat-reflecting glass product if they come off from the wall surfaces of the hood. That is, the solution of a metal compound which has been sprayed over the glass sheet is partially scattered around and caught on inner surfaces of the hood without deposition on the glass sheet. The metal compound caught on the inner surfaces of the hood deposits in situ in the form of undecomposed powder or decomposed metal oxide powder. The powder deposits, upon accumulation to a certain extent, tend to partially come off by mechanical shocks or vibrations and fall on the hot glass sheet, forming spots in the metal oxide film on the surface of the glass sheet. Further, it has been found that the rate of powder deposition and accumulation on the inner surfaces of the hood is closely related to the temperature of the inner surfaces of the hood itself. The rate of powder deposition and accumulation has been found to be slow with an inner surface temperature within a certain range.

It is a primary object of the present invention to provide a method and apparatus for spray-coating a heat-reflecting film on a hot glass sheet, which precludes the formation of the above-mentioned spots in the heat-reflecting film.

It is another object of the present invention to provide a method and apparatus of the class just mentioned which is provided with means for maintaining inner wall surfaces of a hood and an atmospheric adjoining the inner wall surfaces at such temperatures that a metal compound or compounds in sprayed solution particles which have been caught on the inner wall surfaces and which are present in the atmosphere remain in a undecomposed state and are vaporized and removed together with the gaseous solvent and decomposition gas.

According to the present invention, there is provided a method for controlling temperatures of inner wall surfaces of a hood surrounding a spraying zone and adjoining atmosphere during the process of fabricating heat-reflecting glass by coating a solution of a metal compound or compounds by means of a transversely recirpocating spraying means which is located over a transfer line of a hot elongated glass sheet. According to the method of the invention, the spraying zone is enclosed in a hood which has exhaust gas passages for discharging and removing the exhaust gas which is generated by the decomposition of the sprayed metal compound. The inner wall surfaces of the hood onto which sprayed solution particles tend to the deposited or which are exposed to heat radiation from the hot glass sheet are cooled by a coolant fluid flowing in contact with hood walls surrounding the spraying zone and lower portions of the exhaust gas passages. In some cases, however, the inner wall surfaces may be heated by a heat transfer medium in a similar manner, though it is general to cool the inner wall surfaces. As a result, the temperature of the inner wall surfaces of the hood and the adjoining atmosphere is maintained at a level which allows the depositing metal compound of the sprayed solution to remain undecomposed and to evaporate for removal through the exhaust gas passages in the undecomposed form. Various fluids are useful for the practice of the invention and include, for example, liquids such as water, oil, heat transfer medium, gases such as cold or hot air, and the like. For instance, cold or hot air may be caused to flow in contact with the outer surfaces of the hood.

According to the invention, there is also provided an apparatus for carrying out the method described above, which comprises a spraying means supported over a transfer line of a hot elongated glass sheet and reciprocably movable in a transverse direction for spraying a solution of a metal compound onto the upper surface of the glass sheet entering a spraying zone, a hood having a downwardly diverging intermediate portion enclosing the spraying zone and upright end portions forming exhaust gas passages on the front and rear sides of the spraying zone for the exhaust gas to be purged from the spraying zone, and means for maintaining at suitable temperatures walls of the intermediate portion surrounding the spraying zone and walls of the upright end portions which are located in areas susceptible to deposition of sprayed solution particles, and the atmosphere in the vicinity of the above walls.

With the apparatus according to the invention, the temperature of the inner wall surfaces surrounding the spraying zone including the lower parts of the exhaust gas passages and the tempertures of the atmosphere adjoining those inner wall surfaces can be maintained throughout the spray-coating process at such as suitable level that a solution of a metal compound which has been caughht on the inner walls of the hood is vaporized and removed through the exhaust gas passages together with the solvent and decomposition gas without depositing and accumulating on the inner walls in the form of either fine powder or corresponding metal oxide powder.

The present invention has a number of prominent advantages: the coated layer is almost free from uneven spots which detrimentally impair the commercial value of the final poduct; and the continuous production of the heat-reflecting glass is feasible in a stable state over a longer period of time since the growth of the depositing powder layer of the metal compound takes a several times longer time before it reaches an irresistibly great thickness and causes the powder to fall on the glass surface, as compared with the prior apparatus.

The metal compounds useful in the present invention are those which are relatively easily convertible to corresponding metal oxides and include, for example, organic compounds of metals such as chromium, iron, cobalt, nickel, tin, titanium, aluminium, etc. Particularly, acetates, acetylacetonates, aliphatic acid esters of the above-mentioned metals are preferred. These compounds may be used singly or in combination. In practical application, the metal compounds are dissolved in solvent. Examples of the solvents are organic solvents such as alcohols, benzene, toluene, methylene chloride, pyridine and the like.

In order to prevent the solid powder from depositing and accumulating in a large amount on the inner wall surfaces of the hood, the temperaures of the inner wall surfaces and neighbouring zones should be maintained at a level which permits the depositing metal compound to remain as it is in an undecomposed or unsolidified state and then to be vaporized and entrained in the exhaust gas for removal therewith. The temperature level may very depending on the kind or the metal compounds since the metal compounds have inherently different melting points and decomposition temperatures. For example, cobalt acetylacetonate melts and decomposes at 240° C and 340° C, respectively, chromium acetylacetonate at 186° C and 340° C, aluminium acetylacetonate at 193° C and 315° C, and iron acetylacetonate at 180° C and 340° C. When the metal acetylacetonates are used singly, the inner surfaces of the hood and their neighbouring zone should be adjusted to a temperature between the melting point and decomposition temperature thereof. If the metal compounds are used in combination, a temperature between the highest melting point and the lowest decomposition temperature thereof may be preferably used.

In order to maintain or regulate the temperature of the inner wall surfaces of the hood and their meighbouring zones in a range between the melting point and the decompositon temperature of the metal compound, the hood is provided with temperature-regulating means in contact with walls of the intermediate portion and lower portions of the upright end portions of the hood onto which sprayed solution particles tend to be caught or deposited. The temperature-regulating means may be composed of a number of small fluid tubes of suitable form which are mounted on the outer wall surfaces of the hood to run in contact therewith. Alternatively, the hood may be formed in a double wall structure where the temperature regulation or, in most cases, the cooling is required internally providing passages for the fluid such as a coolant fluid. Further, the regulating means may be provided in other forms, for example, a cold air blasting means which is adapted to blast cold air on the wall surfaces of the hood from outside.

If the inner wall surfaces of the hood are heated above the decomposition temperature, the metal compound on those wall surfaces will be thermally decomposed into a corresponding metal oxide, contributing to the growth of the deposition layer. When the temperature of the wall surfaces is below the melting point, the solid paticles of the metal compound deposit continuously on the wall surfaces since the solvent alone is allowed to evaporate. In either case, the deposition of the solid matters occurs in an undesirably large amount.

On the contrary, when the inner wall surfaces of the hood are maintained at temperatures between a melting point and a decomposition temperature of a chosen metal compound, the deposition of the solid matters is reduced in amount and therefore a metal oxide coating film obtained is excellent in quality. Presumably, this is because the metal compound is vaporized without being decomposed, and entrained in and discharged together with exhaust gas. Thus, the deposition and accumulation of solid matters on the inner wall surfaces of the hood is held to a minimum to preclude the possibility of forming uneven spots in the metal oxide film. Further, the continuous production of the heat-reflecting glass becomes possible for a prolonged period of time since the hood would not require changing for the removal of the deposited solid matters not so frequently as in conventional cases.

Figure 2:
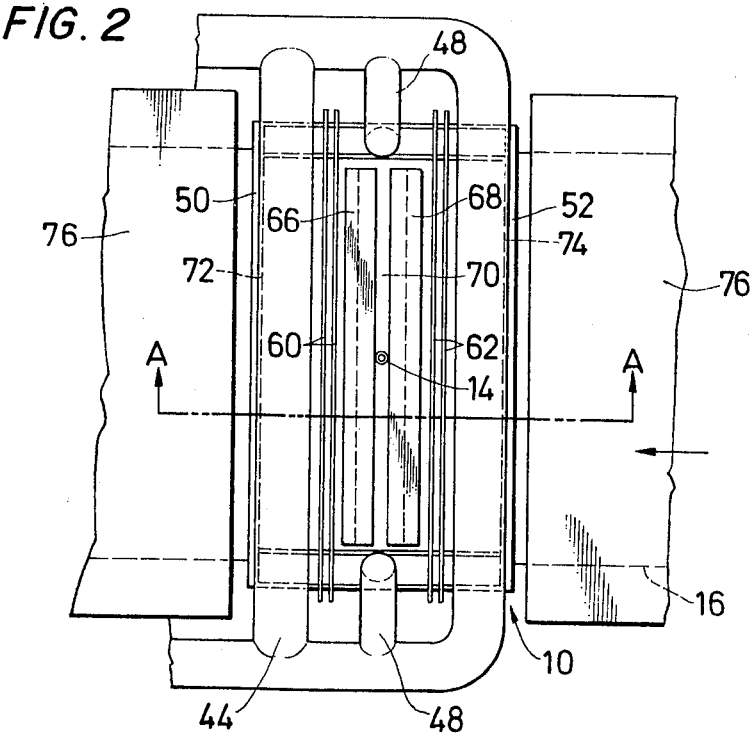

It should be noted that in the method and apparatus of the invention, there can be suitably treated not only a tranferring or moving glass sheet by a continuous process, but also a predetermined length of cut glass sheets by a batch process. dr The invention will be fully understood from the following particular description of preferred embodiments and appended claims, taken in conjunction with the accompanying drawings, in which:

FIG. 1 is a diagrammatical view, partially in longitudinal section taken along the line A—A of FIG. 2, of a spraying-coating apparatus according to the invention; and FIG. 2 is a diagrammatical plan view of the apparatus of FIG. 1.

Referring now to FIGS. 1 and 2, generally designated at 10 is an apparatus which is employed for carrying out the spray-coating method of the invention under cooling conditions. The apparatus 10 includes a spraying means which may be in the form of a spray gun 12 having a neck portion 14 extending downwardly toward a point overhead a hot glass sheet or plate glass ribbon 16 which is being transferred on a roller conveyor 18 at a predetermined speed and a spraying head 20 which is provided at the lower end of the neck portion 14. The spray gun 12 is connected to a storage tank (not shown) which holds a solution of a metal compound, through a suitable conduit means such as a flexible tube indicated at 22. The spray gun 12 is supported on a carriage 24 which is driven from a suitable means to move reciprocating along rails 26 to impart transverse movements to the spray gun 12 relative to the glass sheet 16, reversing the spraying head 20 at the opposite sides of the glass sheet 16 in the usual manner.

A spraying zone 28 which contains the spray cone 30 and the reciprocating spraying head 20 is enclosed in a hood 32 which is fixedly supported over the glass sheet 16 leaving predetermined gap spaces therebetween. The hood 32 includes an intermediate portion 36 having downwardly diverging walls 38 which house the spraying zone 28 and upright end portions 40 at opposite sides of the intermediate portion 36. The opposite end portions 40 form exhaust gas passages 42 which communicate at the lower ends with the spraying zone 28 and open at the upper ends into main exhaust gas ducts 44. The upright exhaust gas passages 42 may each include exhaust-regulating means such as buffle plates indicated at 46 to regulate and uniformalize the flow of exhaust gas. Though not shown, a butterfly damper may be provided within the respective exhaust gas passages 42 for adjusting the amount of exhaust gas which is sucked out therethrough. The main exhaust ducts 44 are extended parallel with the upright and portions 40 of the hood 32 and may further include branch ducts 48 which extend to the opposite ends of the intermediate portion 36 to suction or collect the exhaust gas which otherwise tends to escape from the opposite ends of the intermediate portion 36. The exhaust duct includes a fan (not shown) in the usual manner to suction the exhaust gas through the main and branch ducts 44 and 48.

Cooling means such as small conduits indicated at 50 and 52 are, respectively, provided at the lower parts of the outer walls 54 of the upright end portions 40 of the hood, on the front and rear sides of the spraying zone 28, to cool the walls 54 of the upright end portions 40. The small conduits 50 and 52 may preferably be provided with metal coverings 56 and 58, respectively, in a jacket form without exposing the small conduits 50 and 52. Further, similar small conduit cooling means 60 and 62 are mounted on the downwardly diverging walls 38 and inner walls of the upright end portions 40 which join in V-form as seen in FIG. 1. The small cooling conduits 50, 52, 60 and 62 are respectively connected at opposite ends to feeding and discharging pipes (not shown) for the circulation of a coolant fluid. Instead of the small cooling conduits, the lower parts of the diverging walls 38 and the upright end portions 40 may be fabricated in double-walled construction internally providing passages for the coolant fluid. Alternatively, a gas such as cold air may be directly blown over the lower parts of the outer walls of the hood by means of a gas blower. As mentioned hereinbefore, the coolant may be liquids such as water, oil, heat transfer medium, or gases such as cold air. The choice of the coolant is dependent on the type of the cooling means employed. It will be noted that a hot heat transfer medium may be used instead of the coolant, if necessary, to maintain the temperatures of the inner surfaces of the downwardly diverging walls 38 and the upright end walls 40 and of their neighboring zones at a suitable level. The hood 32 has an opening 64 at the top of the intermediate portion 36. The opening 64 is covered with slidable adjusting plates 66 and 68 mounted on the opposite sides of the neck portion 14 of the spray gun 12 in such a manner that a transversely extending elongated slot 70 is formed between the slidable adjusting plates 66 and 68 to receive the reciprocating spray gun 12 and to guide the transvering movements thereof.

Moreover, adjustng plates 72 and 74 are adjustably provided at the lower ends of the upright end portions 40 of the hood 32, on the front and rear sides of the spraying zone 28, to adjust the width of the bottom gas spaces 34 immediately above the hot glass sheet 16 cn the transfer line.

In operation, the hot glass sheet 16 is continuously transferred by the conveyor rollers 18 through an annealing oven schematically shown at 76 in the direction of the arrow in FIG. 1. The apparatus 10 of the invention is located within the length of the annealing oven 76 at a position where the glass sheet 16 has an outer surface temperature of about 600° C.

Upon entering the spraying zone, a solution of metal compounds, for example, composed of 3.0% by weight of cobalt acetylacetonate, 3.0% by weight of chromium acetylacetonate, 3.0% by weight of iron acetylacetonate and 1.0% by weight of nicket acetylacetonate dissolved in 90% by weight of a mixed solvent of methanol and ethylene chloride in volume ratio of 10/90, is fed from the storage tank to the spray gun 12 and is sprayed over the entire width of the hot glass sheet 16. The spray gun 12 is held in traversing movements in synchronism with the transfer speed of the hot glass sheet 16, so that the solution is uniformly applied onto the hot glass sheet 16.

Upon contact with the hot surface of the glass 16, the metal compounds are thermally decomposed into corresponding metal oxides, forming a metal coating on the glass surface. The gas which is generated by the thermal decomposition of the metal compounds is discharged and removed from the spraying zone 28 through the exhaust gas passages 42 in the upright end portions 40 of the hood 32, while suckingly taking supplementary air from outside mainly through the tranverse slot 64. The width of the slot 64 is properly adjusted to maintain the ambient temperature of the spraying zone 28 at about 250° C.

By maintaining the spraying zone 28 at about 250° C, the sprayed metal compounds are thermally decomposed to form a metal oxide film on the glass surface upon reaching the hot surface of the glass sheet 16. However, part of the sprayed solution particles which hit the glass surface is scattered and carried by the decomposition gas toward the lower ends of the downwardly diverging walls 38 and the upright end portions 40 of the hood 32.

The lower end portions which opposingly face the glass sheet 16, unless the small cooling conduits means 50, 52, 60 and 62 are provided, tend to be heated at temperatures higher than the spraying zone temperature of about 250° C due to strong heat radiation from the hot glass sheet of about 500° C or more. As a result, a part of the fine particles of the metal compound solution entrained in the decomposition gas flow is invariably thermally decomposed into metal oxides at such hot wall surfaces of the hood 32. The depositing metal oxides pick up their amounts to form a large deposition layer, which will be eventually caused to drop on the glass sheet by mechanical shocks or vibrations.

When, however, the wall surface temperature is controlled by passing a controlled amount of water through the small cooling conduit means 50, 52, 60 and 62, the depositing metal compound solution will be vaporized from the wall surfaces and discharged together with the decomposition gas.

As will be understood from the foregoing description, the amount of deposits on the wall surfaces in the vicinity of the spraying zone 28 and the hot glass sheet 16 is remarkably reduced by maintaining the temperatures of the wall surfaces and their neighbouring zones at about 250° C to ensure production of the heat-reflecting glass sheet of satisfactory quality and free from uneven spots.

Although the foregoing detailed description has given on specific examples, it should be understood that the present invention is not in any way restricted thereto, but many other modifications are possible. For example, the upper portions of the upright end portions of the hood in the vicinity of the main exhaust ducts may be also provided with small tube conduits or other suitable means to maintain or heat the upper portions so that the exhaust gas including the decomposition gas and vaporized solvent and metal compound is prevented from being cooled, during the exhaustion, to a temperature below the vaporizing or melting point of the metal compound.

What is claimed is:

1. A process for fabricating heat-reflecting glass comprising the steps of spraying a solution of a metal compound onto one side of a hot glass sheet in a spraying zone enclosed by a hood having exhaust gas passages for discharging and removing the exhaust which is generated by the decomposition of the sprayed metal compound; cooling the inner wall surfaces of said hood which surrounds said spraying zone and the atmosphere adjoining said inner wall surfaces to a temperature of between the melting point and the decomposition temperature of said metal compound, and maintaining said temperature during the continuation of the spraying of said solution whereby the said metal compound that is present in said atmoshere adjacent said inner wall surfaces remains in an undecomposed state and is allowed to evaporate and be entrained in said exhaust gas leaving the said spraying zone.

2. The process in accordance with claim 1, wherein said inner wall surfaces and said atmosphere adjacent said inner wall surfaces are cooled and maintained at a temperature approximately equal to the temperature of the said spraying zone formed by the sprayed solution.

3. An apparatus for fabricating heat-reflecting glass sheets comprising spraying means supported over a transfer line of a hot elongated glass sheet, said spraying means being reciprocating movable in a transverse direction for spraying a solution of a metal compound onto the upper surface of the glass sheet entering a spraying zone; a hood having a downwardly diverging intermediate portion enclosing said spraying zone and upright end portions forming exhaust gas passages on the front and rearward sides of said spraying zone for the exhaust gas to be purged from said spraying zone; temperature control means mounted in operable association with said hood to maintain the temperatures of said inner wall surfaces of said downwardly divering intermediate portions and said upright end portions and the atmosphere adjoining said innerwall surfaces at temperatures of between the melting point and the decomposition temperature of said metal compound whereby the said metal compound that is present in the said atmosphere adjacent said inner wall surfaces remains in an undecomposed state and evaporates and is entrained in the exhaust gas leaving said exhaust gas passages.

4. The apparatus in accordance with claim 3, wherein said temperature control means comprises coolant-circulating conduits mounted on the outer wall surfaces of said hood adjacent said downwardly diverging intermediate portions and said upright end portions forming said exhaust gas passages.

5. The apparatus in accordance with claim 3, wherein said hood including said downwardly diverging end portions and said upright end portions which surround said spraying zone and onto which said sprayed solution particles are caught comprises a double wall structure to provide internal passages for the temperature control fluid.

6. The apparatus in accordance with claim 3, wherein said temperature control means comprises an air blower which is adapted to blast air onto the outer wall surfaces of said hood.

7. The apparatus in accordance with claim 3, wherein said hood includes adjusting plates mounted on the top of said intermediate portion and on opposite sides of a neck portion of said spraying means to adjust the width of a slot adapted to receive said neck portion.

8. The apparatus in accordance with claim 3, wherein said hood includes adjusting plates positioned at the lower ends of said upright end portions opposing said glass sheet at a gap space therefrom on the front and rear sides of said spraying zone to thereby adjust the width of said gap space.

* * * * *